United States Patent [19]

Boelkins

[11] Patent Number: 5,205,378
[45] Date of Patent: Apr. 27, 1993

[54] PULSE-ACTION MIST LUBRICATION SYSTEM

[76] Inventor: Wallace G. Boelkins, 7101 Hidden Ridge Dr., SE., Grand Rapids, Mich. 49506

[21] Appl. No.: 636,502
[22] Filed: Dec. 31, 1990
[51] Int. Cl.⁵ .............................................. F16N 7/32
[52] U.S. Cl. .................................. 184/55.1; 184/6.26; 184/7.4; 184/39.1; 222/494; 222/529
[58] Field of Search .............. 184/7.4, 39, 39.1, 6.14, 184/6.1, 55.1, 6.26, 40; 222/529, 494, 145, 630; 137/845, 844

[56] References Cited

U.S. PATENT DOCUMENTS

| | | | |
|---|---|---|---|
| 2,367,721 | 1/1945 | Gothberg et al. | 184/55 |
| 2,792,911 | 5/1957 | Harter | 184/7.4 |
| 3,059,860 | 10/1962 | Hohn | 239/423 |
| 3,227,378 | 1/1966 | Stewart | 239/412 |
| 3,266,735 | 8/1966 | Webb | 222/494 |
| 3,389,799 | 6/1968 | Thrasher, Jr. | 210/251 |
| 3,412,600 | 1/1969 | Gleason et al. | 184/7.4 |
| 3,456,882 | 7/1969 | Walker | 239/412 |
| 3,481,431 | 12/1969 | Dorsey | 184/7.4 |
| 3,561,680 | 2/1971 | Ott | 239/411 |
| 3,595,342 | 7/1971 | O'Leary | 184/39.1 |
| 3,653,466 | 4/1972 | Fujita et al. | 184/7.4 |
| 3,693,757 | 9/1972 | Callahan et al. | 184/7.4 |
| 3,868,195 | 2/1975 | Anderson et al. | 184/6.26 |
| 3,888,420 | 6/1975 | Boelkins | 184/7.4 |
| 3,926,279 | 12/1975 | Thrasher | 184/29 |
| 4,064,970 | 12/1977 | Reeves | 184/39.1 |
| 4,169,520 | 10/1979 | Lewkowicz et al. | 184/7.4 |
| 4,324,316 | 4/1982 | Thrasher, Jr. et al. | 184/29 |
| 4,391,620 | 7/1983 | Geisel | 184/6.26 |
| 4,533,020 | 8/1985 | Yawazaki | 184/55.2 |
| 4,754,848 | 7/1988 | Azzopardi et al. | 184/6.26 |
| 5,002,156 | 3/1991 | Gaunt | 184/39.1 |

FOREIGN PATENT DOCUMENTS

| | | | |
|---|---|---|---|
| 177817 | 4/1922 | United Kingdom | 239/412 |
| 410094 | 5/1934 | United Kingdom | 239/104 |
| 505353 | 5/1939 | United Kingdom . | |

OTHER PUBLICATIONS

Serv-Oil-SSL preliminary bulletin.
Serv-Oil publication.

Primary Examiner—Ira S. Lazarus
Assistant Examiner—Alan B. Cariaso
Attorney, Agent, or Firm—Price Heneveld Cooper Dewitt & Litton

[57] ABSTRACT

The specification discloses an apparatus for automatically measuring out and discharging desired quantities of fluid such as lubricants or coolants and the like from a self-contained supply of the same, and for pneumatically dispersing the measured quantities of fluid into and propelling it through either a common or a coaxial tube. The dispersed fluid is applied to a desired object or article, in particular a cutting tool, workpiece, operating tool, or the like, at a remote end of said tube, in the form of a pneumatic dispersion or mist of said lubricant, coolant, or other fluid.

13 Claims, 5 Drawing Sheets

PULSE-ACTION MIST LUBRICATION SYSTEM

BACKGROUND OF THE INVENTION

This invention relates generally to apparatus for automatically and repeatedly measuring out and discharging predetermined discrete quantities of fluid such as lubricants or coolants and the like from a reservoir containing an ample supply of the same, and for applying the measured amounts of fluid either in finely-divided (e.g., spray or mist) form or normal (as-provided) state to a desired object or article, in particular a cutting tool, workpiece, operating tool, bearing chain or the like. In a more particular sense, the invention relates to an apparatus of the type just described which pneumatically functions to produce a generally uniform application mist of lubricant, coolant, or other liquid, having regular and continuous but selectively variable density, responsive to a flow of compressed gas, wherein said liquid and said compressed gas are transported together through a single outlet tube, or separately through a coaxial outlet tube, to the point of application.

In a still more particular sense, the apparatus of the invention provides a device of this character in which the discharge of the fluid, whether in aerated form, or normal state, occurs in response to a given command signal or condition and is terminated in response to such a signal or condition. In particular, such a signal may be the presence of compressed air used for operating pneumatic tools, or generated in response to activation of a machine utilized to accomplish an industrial manufacturing operation such as cutting or drilling, in which environment the lubricant or coolant metered from the apparatus is applied to the cutting tool or workpiece in mist form, either on a generally continuous basis or in recurrent bursts of selected frequency.

In industrial operations, particularly in cutting and machining operations, it has long been recognized that it is highly desirable to apply liquid lubricants or coolants to the cutting tools or workpieces, and often to the power tools as well, throughout duty cycles. Sometimes such coolants and lubricants are applied as a generally continuous stream, and sometimes in mist or "atomized" form, for example, sprayed from an appropriate nozzle. In other operations, a succession of droplets is sometimes selected as the preferred form of application In all of these situations, the quantity of the lubricant-/coolant which must be applied is usually the principal determinator of the form of application to be selected, although many other factors may also enter into that selection.

Where the required amount of lubricant or coolant is comparatively small, the regulation of applied quantities becomes a difficult matter. This is particularly true where the desired form of application is mist or spray. Sometimes it is desirable to have a sequence of mist or spray pulses applied to the drill bit, tap and/or the workpiece being drilled during each cycle of drilling operation, but not during intervals when the tool is not actually in use. However, during such use of the tool, the operator has his attention and energy devoted to the drilling task, and cannot be expected to execute or issue periodic stop/start coolant/lubricant supply commands.

Accordingly, it has been proposed heretofore to provide a modular self-regulating supply apparatus for lubricant and coolant in industrial circumstances such as those referred to above, in particular an apparatus of this type which is adapted to cooperative operation in a machining, stamping or air tool environment, and capable of operating on a repeating, cyclical, pulsatory basis to dispense a succession of metered pulses of the lubricant or coolant fluid during each cycle of machine operation. Such devices may be self-contained and adapted to be mounted directly on or near the machine or air tool, and to operate in direct response to on/off signals used to control operation of the the air tool or other machine.

The aforementioned known modular apparatus comprises cyclically operative, pulsatory, lubricant or coolant dispensing means which provide for selective variation in the amount of fluid dispensed in each cycle of operation, as well as the form (spray or normal). Further, these devices feature control means for the lubricant dispensing function whereby their pulsatory operational activity is made selectively variable in frequency. Thus, by use of such apparatus, once the air tool or other such primary device is triggered into operation, both the frequency and amount of applied lubricant or coolant may be selectively regulated to suit the particular task. Additionally, such known devices make it possible to provide periodically metered amounts of lubricant or other liquid in the form of either droplets or mist, as may be required.

Although the known apparatus described above is a highly useful and innovative development which provides many advantages in actual use, it requires use of coaxial tubes or other such dual conduits to separately convey the liquid lubricants or coolants to the cutting tools or workpieces, along with the compressed air or other gas used to "atomize" the liquid into mist form at or near the point of application and apply it to the tool or workpiece. That is, the compressed air is conveyed through one tube of a coaxial pair, and lubricant/coolant is provided through the other such tube. At the remote end of the coaxial tube, the compressed air and lubricant/coolant are mixed as they are dispersed, typically by using a desired nozzle. Because the compressed air and lubricant/coolant must be supplied separately through coaxial or other duplicate tubes, this approach requires that a relatively complex, and more costly, manifold be provided, along with the coaxial tubing, which is also more expensive. Additionally, the coaxial nozzle which mixes and disperses the liquid from the interior tube by using the compressed gas carried in the exterior tube adds expense and further complexity.

SUMMARY OF THE INVENTION

Accordingly, the present invention recognizes that a need exists for a lower cost, versatile, modular, self-regulating application apparatus for lubricant/coolant and air in industrial circumstances and, in particular, a modular apparatus of this type which is well-adapted to cooperative operation in the air tool environment, and especially an apparatus having these overall attributes and which operates by using a single tube for transporting and dispensing a lubricant/coolant mist along with a flow of compressed air, either on a generally continuous basis or as a succession of metered pulses occurring during each cycle of air tool operation.

The present invention provides an apparatus meeting all of the aforementioned criteria and which lends itself especially well to operation in conjunction with manufacturing machines More particularly, an apparatus according to the invention is, in a preferred embodiment, a unitary and self-contained device adapted to be mounted directly on or with a machine to operate in direct response to control actuation, that is, in response to an on/off flow condition of compressed air, and having either a single tube through which a mixture of compressed gas and lubricant/coolant are carried and dispensed, or a coaxial tube through which lubricant/coolant and air are carried separately.

Further important aspects of the apparatus in accordance with the invention comprise the provision of cyclically operative positive-displacement pulsatory lubricant or coolant dispensing means, for dispensing specifically selected amounts of lubricant/coolant into a chamber, together with a pneumatic source for dispensing the contents of said chamber and an outlet through which a compressed gas displaces the lubricant or coolant in said chamber. Apparatus in accordance with a preferred form of the invention additionally features a variable orifice at the remote end of said single tube, whereby the pulsatory operational activity may generate pulsating bursts of the mist-like mixture of lubricant/coolant and compressed gas, and employ a novel form of such an orifice which also prevents the formation, and emission, of droplets of the lubricant/coolant from the remote end of said tube.

These and other features, advantages and objects of the present invention will become apparent upon reading the following description thereof, together with reference to the accompanying drawings.

BRIEF DESCRIPTION OF THE DRAWINGS

In the appended drawings setting forth an exemplary preferred embodiment of the invention.

DESCRIPTION OF THE PREFERRED EMBODIMENTS

Figure 1:
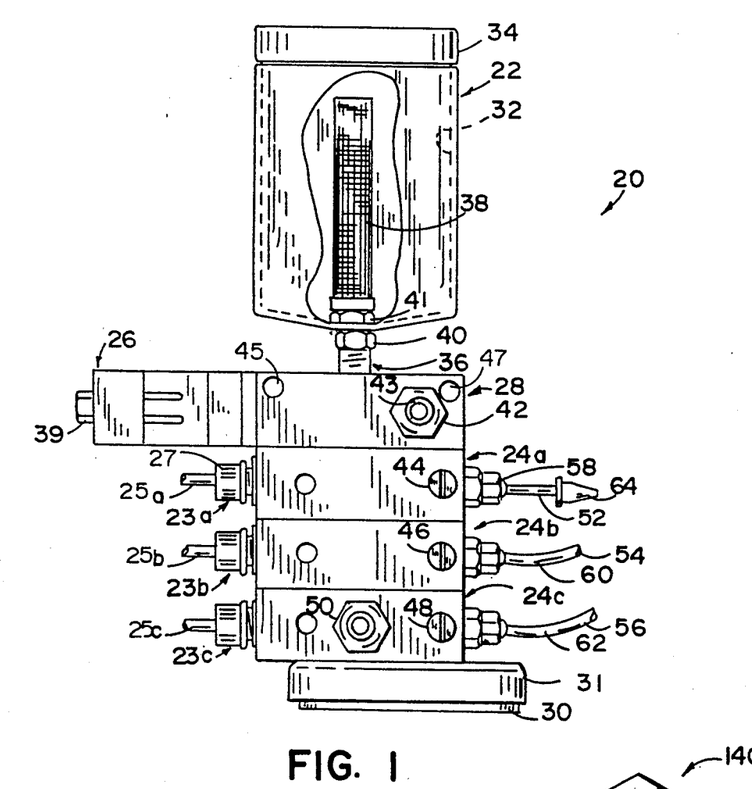
FIG. 1 is a side-elevational view of the overall apparatus contemplated by the invention in assembled form, showing a first form thereof having a gravity feed of the lubricant/coolant.
Figure 2:
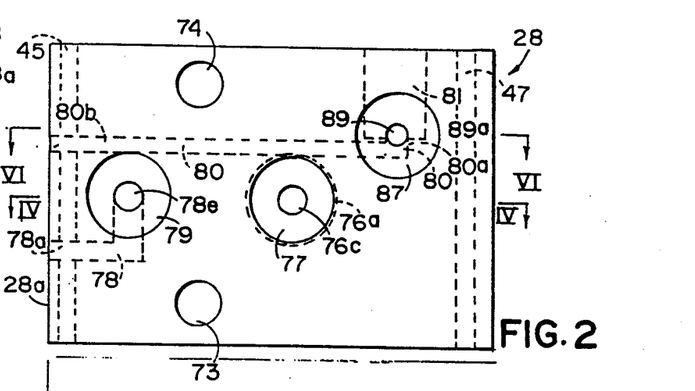
FIG. 2 is a bottom plan view of the fluid manifold portion of the overall apparatus illustrated in FIG. 1.

Referring now in more detail to the drawings the overall apparatus in accordance with the invention may be seen in FIG. 1 to comprise a self-contained, unitary, lubricant/coolant source and applicator apparatus 20, of which the basic components include: a gravity-feed reservoir 22 for holding a desired quantity of the lubricant or coolant fluid; injectors or pumps 23a, 23b and 23c mounted within respective injector modules 24a, 24b and 24c; a pulsatory control apparatus 26; and a fluid manifold and base 28, to which the fluid reservoir 22, the pulsatory control apparatus 26, and the injector modules 24a-24c inclusive, are mounted, in a manner to be described subsequently. The apparatus thus described is integrally connected together and unitary in its overall structural nature, and may include, if desired, a magnet 30 having a cover 31 fixedly attached to injector module 24c for mounting the applicator apparatus to a desired support or other object, in particular, to the machine, device or air tool in conjunction with which the apparatus is to be used.

As illustrated in FIG. 1, reservoir 22 includes a tubular outer envelope 32 which is closed at its top by a threaded cover 34 and coupled to manifold 28 by male pipe nipple 36. Nipple 36 comprises a rigid tube which is threaded along most of its length and has a hex-shaped portion 40 which is used to secure envelope 32 on the threaded tube, there being a hex nut 41 screwed onto the upper threaded portion of the nipple inside envelope 32, which is tightened against nut 40 with the end of envelope 32 therebetween. Additionally, a generally rigid metal mesh filter tube 38 extends into envelope 32 and is screwed onto male nipple 36 above nut 42 to allow the oil or coolant in envelope 32 to flow out of the envelope through the nipple 36. The outer envelope 32 is threaded at the end which receives threaded cover 34, such that reservoir 22 may be refilled with oil or coolant when the cover is temporarily removed. Reservoir 22 operates to provide a gravity feed source of lubricant/coolant through the hollow interior of male nipple 36 into base manifold 28, and from there into injector modules 24a-24c inclusive, in a manner which will be described below.

The pulsatory control apparatus 26, referred to above, comprises in a preferred embodiment, a pneumatic pulse generator, or electric timer and solenoid valve whose basic function is to provide a sequence of recurring actuation pulses to the injectors 23a, 23b and 23c in response to which the injectors provide a corresponding sequence of metered charges of a lubricant or coolant from reservoir 22. More particularly (and with continued reference to one preferred embodiment of the invention) the pneumatic pulse generator, or pulsatory control, 26 may be implemented by use of a commercially available device made by the Crouzet Company of France, which identifies this product as its Part No. 81506920. Basically, this device operates to provide a regular succession of output pulses of pressurized air (or other gas) when supplied with a continuous pressurized input thereof. The frequency of the output pulses may be varied, and selectively adjusted by a screw-type control 39 (FIG. 1) located on the top of the pulse generator. Alternatively, the pulsatory control apparatus may have a shunt 100 (FIG. 11) substituted therefor, in a manner which will be described below.

The injectors 23a, 23b and 23c are devices of the type which eject discrete metered volumes of fluid from a continuous supply in response to specific control actuation. The injectors may be generally of the type shown in U.S. Pat. No. 3,421,600 which are sometimes referred to as a "servometer" and which are now well-known devices in the trade that are made and/or sold by a number of sources. Basically, this apparatus comprises an in-line metering pin which moves through a closely-fitted chamber to eject a measured volumetric amount of liquid therefrom in response to an actuating force. Such actuating force may be provided in the form of a pulse of air or other fluid under pressure, or by a mechanical impulse physically applied to the projecting longitudinally-slidable stems 25a, 25b and 25c, which double as a variable control element for selection of the desired volume output charges metered out of the injector by its internal metering pin in response to each pulse actuation. More particularly, rotation of the stems 25a–25c changes the length of the throw o stroke of the respective metering pins due to a threaded connection between the latter and respective actuating pistons therefor, to which stems 25a–25c are coupled.

Figure 8:
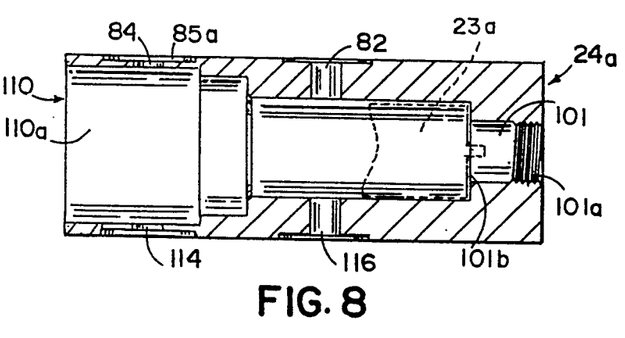
FIG. 8 is a sectional side view of the injector module shown in FIG. 7, taken along the plane VIII—VIII of FIG. 7.
Figure 9:
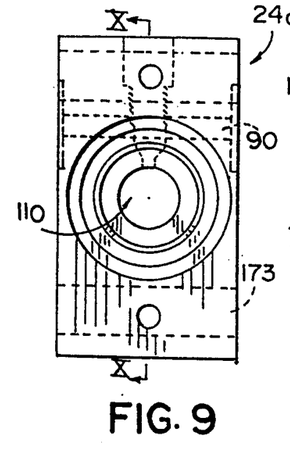
FIG. 9 is an end view of the injector module illustrated in FIGS. 7 and 8.
Figure 10:
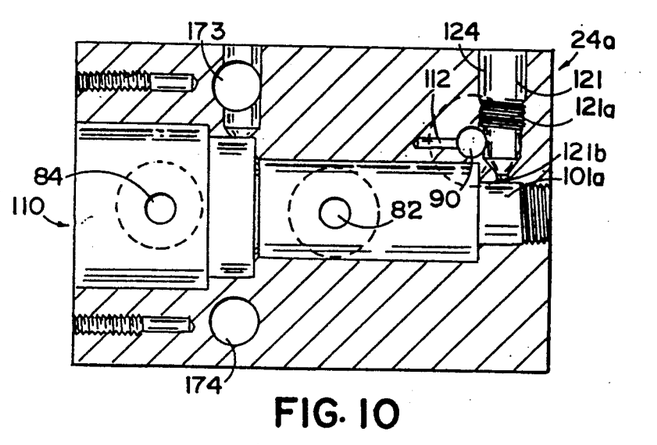
FIG. 10 is a sectional plan view of the apparatus shown in FIGS. 7, 8 and 9, taken along the plane X—X of FIG. 9.

Injectors 23a–23c also include a novel output, which surprisingly allows either a coaxial tube or single tube to be connected to the respective output chambers 101 (FIG. 8) of injector modules 24a–24c. The output of injectors 23a–23c close end 101b of chamber 101, and include a central, cylindrical, projection, which extends approximately one-half of the length of chamber 101 and has an outside diameter substantially smaller than the inside diameter of chamber 101. The outside diameter of the cylindrical projection is preferably sized to receive a standard-sized (e.g., 3/32") internal tube of a coaxial tube 107 (FIG. 13), although any particular diameter tubing may be utilized, with an appropriate projection sized to mate therewith, according to the application for which the injector is utilized.

Base manifold 28 includes a coupling 42 by which it, and thus the overall apparatus 20, is connected to a source of compressed air or other such operation fluid, most preferably the supply line which operates an air tool if the apparatus of the invention is to be used in conjunction with such a tool, since the onset of air pressure under such circumstances will operate as a control signal associated with the machine with which the invention is being used. That is, normal selective actuation of the air tool or machine results in the application of pressurized air to the manifold 28 through the aperture 43 at the center of coupling 42 thereby simultaneously actuating the apparatus 20, as will be seen, however, any desired sources of compressed air may be used, since the apparatus may be controlled in a number of different ways.

Referring to FIG. 1, injector modules 24a–24c inclusive each have a respective output tube 52, 54 and 56, to which they are connected by couplers 58, 60 and 62, respectively, which are threaded and received in threaded apertures (101a in FIG. 8) in an end of modules 24a–24c. The end of tubes 52, 54 and 56 remote from connectors 58, 60 and 62 most preferably have an automatic variable orifice 64, which is described in detail below.

Figure 3:
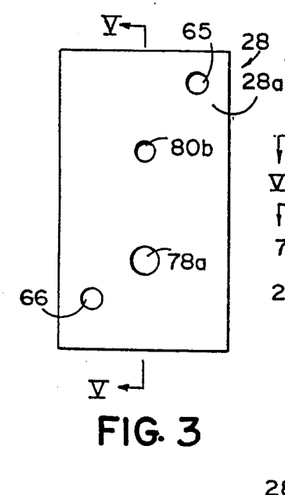
FIG. 3 is an end view of the fluid manifold of FIG. 2.

The manner in which the components or elements referred to above are interconnected for operation is made evident by consideration of the structure shown in FIGS. 2–10, inclusive. More particularly, the fluid manifold and base 28 is illustrated in detail in FIGS. 2–5, inclusive. Referring to the bottom view of manifold/base 28, illustrated in FIG. 2, apertures 73 and 74 comprise threaded mounting holes by which injector modules 24a–24c are secured to base manifold 28, by way of screws (not shown) which extend upwardly through openings 173 and 174 (FIGS. 7 and 9) of the injector modules. The screws which are received in threaded apertures 73 and 74 extend all the way through modules 23a–23c and into manifold 28, to hold the four such elements together as a single unit, as shown in FIG. 1. Apparatus 20 is thus integrally formed as self-supporting structure from the interconnection of any number of modules such as 24a–24c and manifolds 28 without the use of a separate supporting member such as a back plate, mounting bracket or the like. Referring to FIG. 3, apertures 65 and 66 in end 28a of base/manifold 28 comprise threaded mounting holes by which the pulsatory control apparatus 26 is secured to manifold/base 28, by way of screws (not shown) which extend through apparatus 26 in order to hold the pulsatory control apparatus and manifold/base 28 together as a single unit. Additional bores 45 and 47 extend through manifold 28 and provide a passage through which mounting screws (not shown) may pass. Such mounting screws may be used to attach apparatus 20 to a support or a machine or tool with which the apparatus is used, whereby the apparatus may be fixedly mounted in place at a convenient location near the various devices to be lubricated or cooled.

In addition to the features just noted, the manifold/base 28 includes a series of apertures and associated passages for transfer of lubricant/coolant and compressed air (or other such fluids) between the various component parts of the overall apparatus. In particular, a first passage 76 (FIG. 4) located centrally within the base manifold extends downwardly therethrough to communicate between male nipple 36 of reservoir 22 and aperture 82 of the top injector module 24a. On the left-hand side, a passage 78 having an open end 78a couples the impulse control apparatus 26 and aperture 84a of the injector modules 24a (see FIGS. 4 and 8). On the right-hand side, a passage 89 (FIGS. 2 and 6) communicates with an aperture 81 which receives connector 42 (FIG. 1), and also with a passage 80 which extends longitudinally between impulse apparatus 26 and aperture 81, as well as communicating with aperture 90a in module 24a. The elongated passage 80 (FIGS. 2 and 5) communicates between an end aperture 80b and internal aperture 80a for passing compressed gas (e.g., air) or fluid from opening 81 to the impulse control apparatus 26. A passage 89 (FIG. 6) having an outwardly-opening aperture 89a communicates with an aperture 90a in injector manifold/module 24a and also with the aforementioned aperture 81 in base/manifold 28.

The aforementioned passage 76 in base/manifold 28 includes a larger-diameter cylindrical chamber 76a (FIG. 4) comprising a counterbore of passage 76c and connected thereto by angular walls 76b. The larger such chamber 76a is threaded to receive the threaded shaft of nipple 36 (FIG. 1), by which the base/manifold 28 is coupled to reservoir 22 (or other comparable supply pipe or fitting extending from another such source, whether gravity-fed or otherwise). Portion 76b acts as a funnel to channel the fluid from reservoir 22 into passage 76c, which in turn channels the fluid from reservoir 22 into passage 82 of injector module 24a, when overall apparatus 20 is fully assembled. Aperture 76c terminates through a larger-diameter coaxial opening 77 for receiving a rubber gasket (not shown in any of the drawings) for sealing the connection between aperture 76c of base 28 and aperture 82 (FIG. 7) of injector module 24a. To facilitate such sealing, a larger-diameter aperture 83 is provided in module 24a having a common center with aperture 82 and aligned with aperture 77 in manifold/base 28.

Passage 78 of base/manifold 28 (FIGS. 2, 4 and 5) channels output impulses from impulse control apparatus 26, initially applied through inlet aperture 78a on side 28a of base/manifold 28. Passage 78 communicates from its inlet 78a to its outlet aperture 78e, which abuts and communicates with aperture 84a (FIG. 7) of module 24a. Aperture 78e has an enlarged coaxial recess 79, for receiving a gasket for sealing the connection between aperture 78e of base/manifold 28 and aperture 84a of the injector module 24a. To facilitate sealing between these apertures, aperture 84a has a common center with a larger-diameter recess 85 which aligns with recess 79 when module 24a and manifold 28 are correctly aligned with each other.

Figure 5:
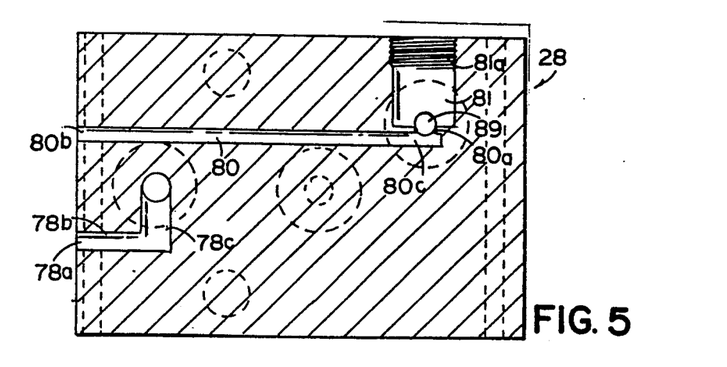
FIG. 5 is a sectional plan view of the apparatus shown in FIG. 3, taken along the plane V—V thereof.
Figure 6:
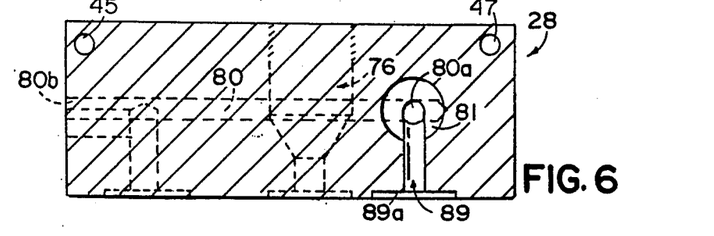
FIG. 6 is a sectional side elevational view of the apparatus shown in FIG. 2, taken along plane VI—VI thereof.
Figure 7:
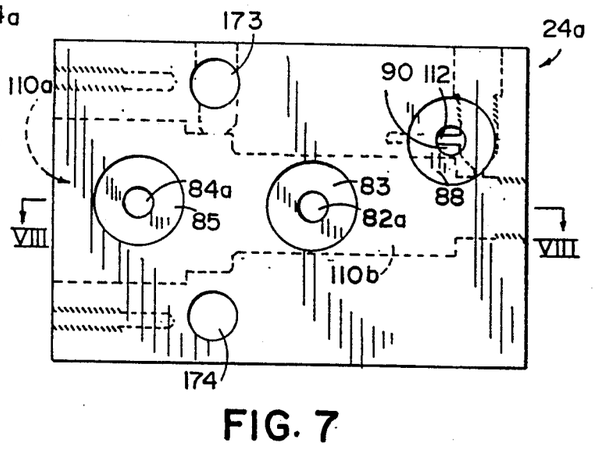
FIG. 7 is a top plan view of one of the injector modules of the overall apparatus illustrated in FIG. 1.

Referring to FIG. 5, the aforementioned passage 80 of base/manifold 28 communicates between its outlet aperture 80b and internal aperture 80a, for coupling pressurized gas (air) to impulse control source 26 from passages 81 and 89 of base/manifold 28. It should be noted in this regard that passage 81 opens outwardly through the side of the base/manifold 28 via an integral threaded portion 81a which receives the coupling 42 noted previously. Accordingly, passage 81 constitutes an inlet port for the compressed air or gas utilized by the device, and it will be noted that passage 81 also communicates with an internal passage 89 (FIGS. 2, 5 and 6) which has an end aperture 89a for abutting a corresponding aperture 90a of injector module 24a. Thus, passage 89 places the injector module in flow communication with the compressed air source. To facilitate sealing between these components, enlarged coaxial surface counterbores 87 and 89a are preferably provided for holding O-rings or other such seals which abut one another when module 24a and manifold 28 are correctly aligned and connected with each other.

Injector module 24a, referred to generally in connection with FIG. 1, is illustrated in more detail in FIGS. 7-10. Only injector module 24a is described in detail below, as injector module 24b is identical thereto, and injector module 24c differs therefrom only in that module 24c is located at the bottom of the stacked assembly 20 shown, and thus does not include lower passages for communicating between module 24c and another module mounted below it. Referring to the top view of module 24a illustrated in FIG. 7, module 24a includes a pair of mounting apertures 173 and 174 which, as mentioned above, have elongated machine screws passing therethrough for holding the four component members together (manifold 28 having cooperatively-positioned threaded apertures 73 and 74 to receive such screws extended through apertures 173 and 174). Internally, the injector module 24a has a large, centrally disposed recess 110 (FIGS. 7 and 8) extending longitudinally therethrough, which is configured to cooperatively receive the injector or pump 23a described in connection with FIG. 1.

In order to provide impulse control flow communication as necessary, the injector module 24a includes a first internal passage 84 (FIGS. 7 and 8) through which injector 23a receives control impulse commands or signals from impulse control generator 26, supplied via passage 78 (FIGS. 2-6) of manifold/base 28. As described above, passage 84 opens outwardly through an aperture 84a which is coaxially aligned with the counterbored recess 85 (FIG. 7), which recess receives a gasket or other seal (not shown). The large central recess 110 has a series of coaxially aligned chambers of differing diameters (FIG. 7), of which a first, designated by the numeral 110a, houses a portion of injector 23a which includes an inlet port for receiving pneumatic control impulses which actuate the internal positive-displacement piston rod (not shown) by which the injector meters out specific quantities of liquid, as is well known to those skilled in the art. A lower passage 114 extending laterally from chamber 110a opens outwardly through the bottom of module 24a. Module 24c includes an upper passage 84, but does not include a lower passage 114 like that of modules 24a and 24b, as manifold module 24c is used as an end structure and does not couple with another injector module disposed below it.

Figure 4:
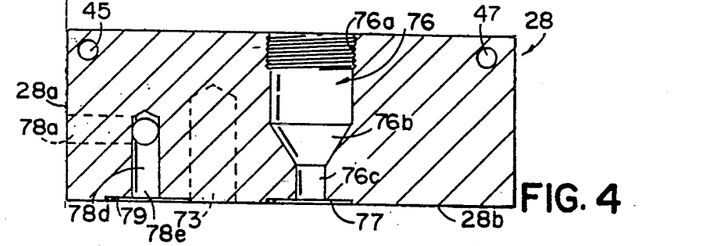
FIG. 4 is a sectional, side-elevational view of the apparatus shown in FIG. 2, taken along the plane IV—IV thereof.

A central passage 82 (FIG. 8) in injector/module 24a receives lubricant or coolant which is supplied from reservoir 22 through manifold/base 28 via its passage 76 (FIG. 4). As described above, passage 82 has an enlarged coaxial and recess 83 (FIG. 7) for receiving a seal or gasket (not shown). Passage 82 communicates between a portion 110b of the injector recess 110 which houses a portion of injector 23a that includes its metering chamber (not shown). This chamber of injector 23a has a small inlet opening for receiving lubricant/coolant from reservoir 22, which lubricant/coolant is displaced from said chamber by a positive-displacement piston rod (all of which, though not shown, is known in the art). Fluid from reservoir or other source 22 which is in excess of that received in the metering chamber of injector 23a passes out of portion 110b of recess 110 through a lower passage 116 (FIG. 8) and is supplied to the next adjacent injector module 24b, which is identical to module 24a. The lowermost module 24c includes an upper passage identical to passage 82 of module 24a for receiving lubricant/coolant from the lower passage 116 of module 24b, but as already noted does not include a comparable such lower passage for communicating with another module. Module 24c preferably includes a threaded plug 50 (FIG. 1) which may be removed to access interior chamber portion 110b for inletting or outletting lubricant/coolant therefrom.

Injector/module 24a also includes a passage 90 (FIGS. 7 and 10) which passes through it and communicates with passage 89 in manifold/base 28 (FIG. 2), as well as with a passage in module 24b identical to passage 90. Passage 90 also communicates with orthogonal passage 112, which in turn communicates with passage 121. Passage 121 includes a threaded portion 121a (FIG. 10) which is for receiving a threaded plug or connector through recess 124. As passage 121 communicates with outlet chamber 101, by inserting a plug in recess 124 chamber 101 will be made to receive only fluids and/or gasses from passage 90 and injector 23a. However, a connector may also be inserted in recess 124, and a compressed gas or a liquid may be supplied through such connector to chamber 101, for passage through an outwardly-opening passage 101a. Of course, passage 90 communicates with module 24b, which includes an identical such passage and module 24c includes a comparable passage aligned with such identical passage in module 24b, but only passing so far as an orthogonal passage identical to passage 112.

Figure 11:
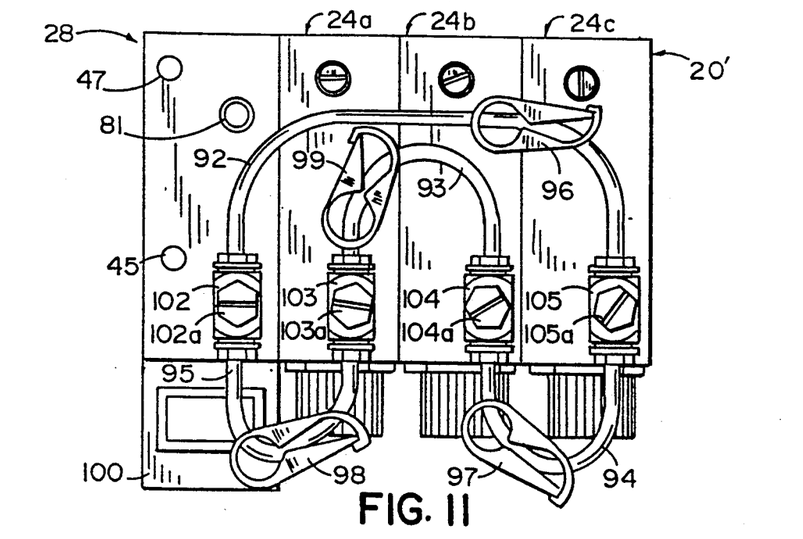
FIG. 11 is a side elevational view of the base manifold and injector modules of the overall apparatus illustrated in FIG. 1, and further including a shunt and supply tubing which may be used with the overall apparatus.
Figure 12:
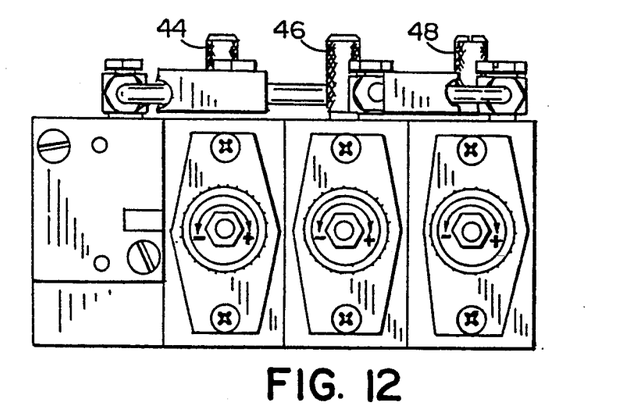
FIG. 12 is an end view of the apparatus illustrated in FIG. 11.
Figure 13:
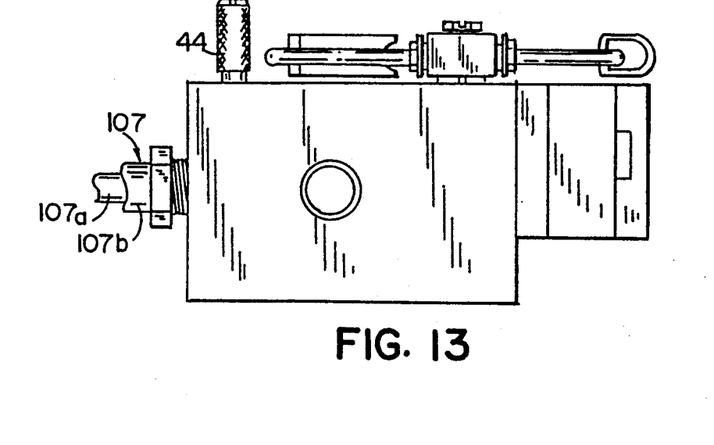
FIG. 13 is a top view of the apparatus illustrated in FIG. 11.

A particularly versatile embodiment 20' of the invention is illustrated in FIGS. 11–13 and includes externally mounted T-connectors 102–105 inclusive, supply tubes 92–95, and selectively actuable flow-control devices 96–99. Mounting screws 102a–105a for T-connectors 102–105 provide passages between tubes 91–95 and the internal passages of manifold 28 and modules 24a–24c, as by means of a center bore as well as cross-passages near the head of each such screw which communicate with the respective passages to which the associated T-connector is coupled. T-connector 102 thus connects passage 78 of base/manifold 28 (FIG. 5) with external tubes 92 and 95. T-connector 103 in turn communicates with chamber 110a of injector module 24a (FIG. 8) and tubes 95 and 99. T-connectors 104 and 105 similarly communicate with tubes 92, 93 and 94 and respective injectors 23b and 23c. Additionally, each such tube includes a respective resilient closure 96–99 for selectively preventing the passage of air therethrough. Closures 96–99 may simply comprise plastic or other resilient clasps which will latch in a closed position when desired, or they may optionally include intermediate latch positions wherein they will function as variable flow control elements which step down the magnitude of the fluid control signal output for manifold 28, rather than the on/off control provided by the known types of closures 96–99 illustrated in the drawings. However, the on/off closures illustrated allow any one of the injectors to be selectively disabled by closing the tubes which provide air from manifold 28 to the respective injector input. In order to implement the selective control of the injector air pulses, sealing discs may be placed between aperture 78e (FIG. 2) and aperture 84a (FIG. 7), as well as between the respective injector input passages 84 and 114 (FIG. 8) in injector modules 24a–24c in place of the aforementioned O-rings or other seals, to thus block off these passages from one another.

A shunt 100 (FIG. 11) may be advantageously provided in place of the control apparatus (pneumatic pulse generator) 26 to pass the applied control signal or fluid pressure directly from aperture 80a to passage 78. Shunt 100 thus has an internal passage (not shown) which connects apertures 80b and 78a together (FIG. 3), which is particularly advantageous when the device 20' (or particular injector modules thereof) is to be used with machines which provide, or are best used with, a separate control signal, such as a fluid pulse, when lubrication or cooling is desired, on a one-to-one basis. The shunt 100 may also be used advantageously where it is desirable to have impulse generator 26 located remote from apparatus 20 so that a machine or tool operator may access the control 39 (FIG. 1) more easily.

As further illustrated in FIG. 13, the apparatus 20/20' may utilize pairs of coaxial output tubes 107 through which the lubricant/coolant and fluid pressure (either pneumatic or liquid) are output respectively. As described above, injectors 23a–23c produce fluid outputs adjacent chamber 101, and include a cylindrical projection through which output fluid is dispensed from the injectors. The cylindrical projection may receive the inside tube 107a of a coaxial tube pair 107, whereby fluid from the injector will be received separately and individually in the internal tube, rather than being immediately aerated and divided into small droplets, and will flow in a stream therethrough to the remote end of the coaxial tube. The coaxial tubes 107 thus separately carry both the lubricant/coolant dispensed by injectors 23a–23c and the control or actuating fluid (e.g., compressed air) coupled from the passage 121 (FIG. 10) through chamber 101 and outer tube 107b. In this manner, the dispensed lubricant may be applied in the form of a mist or spray at the point of application, since the compressed air from outer tube 107b may be used to "atomize" (i.e., break up into small droplets) the lubricant or coolant ejected at the same point from the other tube within the coaxial conduit (designated 41 in FIG. 1) as for example, by using an appropriately-sized coaxial nozzle (not shown) at the remote end thereof. Additionally, the versatility of the overall apparatus 20 is enhanced by the ability of each injector to individually receive either a pair of coaxial tubes or a single tube without modification of the injector module, and independently of the type of tube connected to the other adjacent modules.

Figure 14:
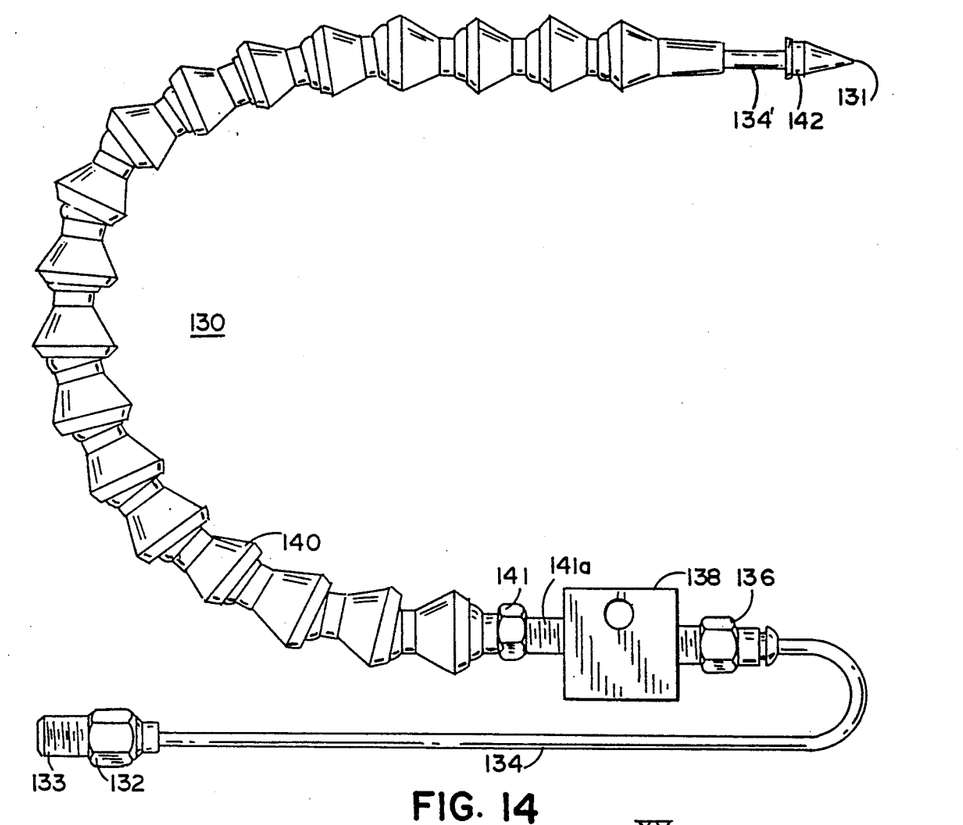
FIG. 14 is a plan view of an applicator apparatus which may be used with the dispensing apparatus illustrated in FIG. 1.

Referring to FIGS. 14–19, a particularly advantageous form of applicator tube apparatus is illustrated, for use in the convenient and accurate positioning of the remote end 131 of outlet tube 130, and for control and dispersion of the contents thereof. Referring to FIG. 14, connector 132 includes a threaded portion 133 for screwing into an injector module, i.e., injector modules 24a–24c (FIG. 1). A tube 134 is attached to connector 132 and extends to a second connector 136, which is threadedly attached to a junction block or adapter 138. A tube guide 140, which includes a connector 141 coupled to junction block 138, ends in a variable orifice 142.

Figure 15:
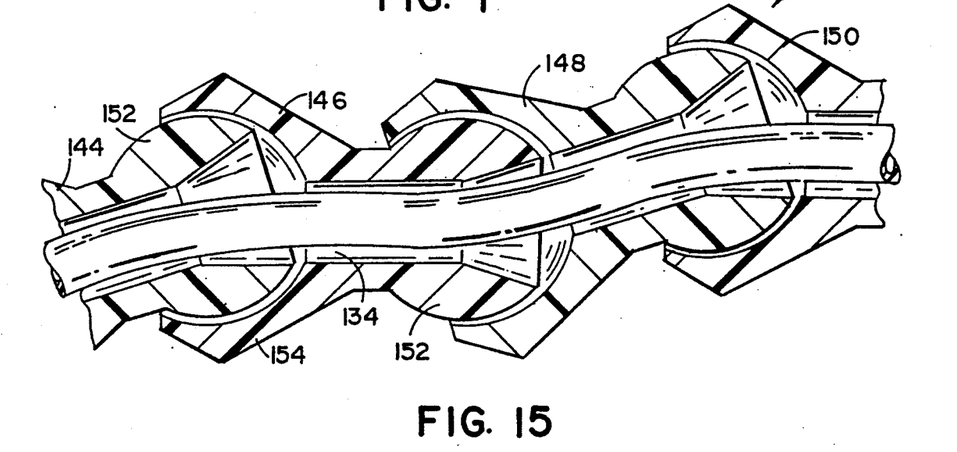
FIG. 15 is a central sectional view of a portion of the applicator apparatus illustrated in FIG. 11.
Figure 16:
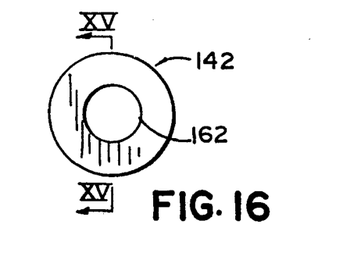
FIG. 16 is a rear end elevation of an automatic variable orifice preferably used in the overall apparatus and illustrated in FIGS. 1 and 11.
Figure 17:
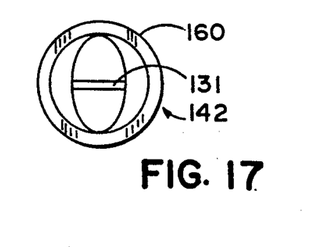
FIG. 17 is a front end elevation of the automatic variable orifice illustrated in FIG. 11.
Figure 18:
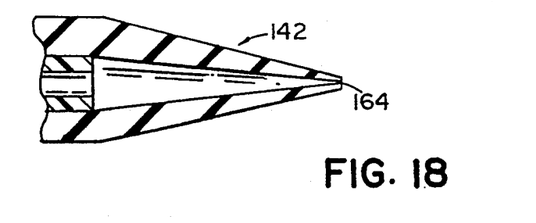
FIG. 18 is a fragmentary sectional, side-elevation view of the automatic orifice of FIG. 13, taken along the plane XVIII—XVIII thereof.
Figure 19:
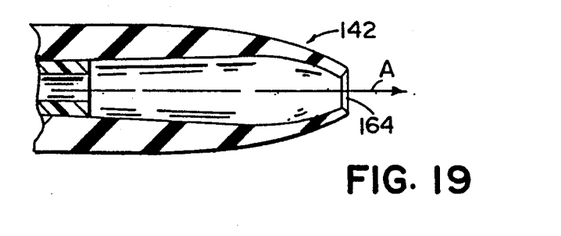
FIG. 19 is a fragmentary sectional, side-elevation view of the structure shown in FIG. 15 but showing the orifice in an opened condition as when dispensing a mist.

Referring to FIG. 15, tube guide 140 includes a plurality of interconnected ball joint sections 144, 146, 148 and 150, each of which includes a ball portion 152 and a cone portion 154. Cone portion 154 receives ball 152 of the adjacent guide section, in a friction fit that holds the adjacent sections in place but allows them to pivot a predetermined amount relative to each other. The adjacent sections have a sufficiently close fit to be secured tightly together, so that when oriented, the ball joints will hold their position until deliberately manipulated by hand to a new position.

FIGS. 16–19 illustrate an outlet device 142 which provides an automatic variable orifice in accordance herewith. The device 142 is in actuality an off-the-shelf item generally know as a "duck-billed check valve," which comprises a one-piece member molded from elastomeric material which is normally used to prevent backflow; however, the particular and different use of this device, as described hereinafter, is believed to be novel and is highly advantageous. Device 142 includes a rim portion 160 (FIG. 17) surrounding an opening 162 which frictionally receives a tube 134' (FIG. 14) which carries lubricant/coolant and compressed gas therein. Tip 131 has a slit-like opening 164 which is normally closed, i.e. when sufficient pressure is not present in tube 134', as illustrated in FIG. 15. When the pressure in tube 134' reaches the "cracking pressure" threshold of the device 142, which is sufficient to cause the slit 164 in tip 131 to open, the coolant/lubricant will be expelled outward, in the direction illustrated by arrow A in FIG. 16. It is important to note, in this regard, that the liquid so expelled from tube 131 is dispersed in mist or spray form, for advantageous use in lubricating or cooling a machine or tool requiring only small overall quantities.

In the arrangement just described, and with reference to the various figures generally, it will be seen that compressed air applied to aperture 81 of manifold 28 communicates through passage 80 to pulse generator 26 and, at the same time, is transferred through passage 89 to injector modules 24a, 24b and 24c via their mutually-aligned passage 90. The pulse generator 26, in response to application of compressed air from passage 80, provides a continuous sequence of output pulsations of the applied air (or other such pressurized fluid) at a selected frequency of occurrence. These pulsations enter aperture 78a of base manifold 28 and are transmitted along passage 78 thereof to the injector modules, through their mutually aligned passage 84. As a result, these compressed air pulsations are applied via passage 84 to the injector pumps 23a, 23b, etc., causing them to cycle repeatedly and eject a corresponding sequence of metered volumes of a desired lubricant/coolant.

It will also be seen that where T-connectors 102–105 and tubes 92–95 are used, as in the embodiment 20' of FIGS. 11, 12 and 13, a control signal applied to aperture 81 of manifold 28 communicates through manifold 28 and impulse control 26 (or shunt 100), to T-connector 102. When flow controllers 96–99 are open, the control signal will be applied from T-connector 102 via tubes 92–95 to injectors 23a–23c. In response thereto, the injectors will meter out a corresponding sequence of volumes of a desired lubricant/coolant, either directly to the internal tube 107a or to the aeration chamber 101, depending upon whether the coaxial tube or single tube outputs are used. On the other hand, by way of example, if controllers 97 and 98 are both closed, injector 23b will not receive a control signal from T-connectors 103 and 105, and this injector will therefor not eject fluid from its output, whereas injectors 23a and 23c will nonetheless continue to dispense lubricant/coolant in the normal manner.

The lubricant/coolant provided to the injectors 23a, etc., comes from reservoir 22 (or other such source) through passage 76 in manifold/base 28, and through its mutually aligned extension 76c, to injector module passage 82, which communicates with injector 23a. Additionally, such fluid will also pass through passage 116 to injector modules 24b and 24c for discharging lubricant/coolant from each. The metered quantities of lubricant/coolant displaced from each injector are received in the aeration chamber 101 of their corresponding injector modules, or in the internal tube of a coaxial tube coupled thereto where that configuration is selected, and the chambers 101 communicate with the compressed gas (e.g., air) flowing in passage 121. Compressed gas is conveyed to chamber 101 of the injector modules via passages 90, 112 and 121, which are connected to compressed air input port 81 in base manifold 28; alternatively, as mentioned above, compressed gas may enter the injector modules directly through passage 121 and recess 124.

Where a single output tube (52, 54, 56) is used, the compressed gas entering chamber 101 will displace the liquid lubricant/coolant injected into this chamber, forcing it out into tube 52, and it has been found that, surprisingly, this will also mix with and disperse this liquid into very small droplets that adhere to the inside surface of tubes 52, 54 or 56 and travel therethrough in much the same form, in response to the influence of the compressed air passing through the tube. Although either lubricants or coolants may be applied using the apparatus of the invention, fluids which are not water-soluble will work best with a single tube, as the high surface tension of these materials allows them to migrate in separate droplet form along the tube, breaking up as they do so, and thus forming a reasonably uniform distribution which is emitted from automatic variable orifice 142 This relatively uniform emission occurs so long as the pressure within the single output tube exceeds the "cracking pressure" of the reclosable orifice, even though the associated injector **23*a* etc. provides an intermittent supply, the relative amount and frequency of which primarily serve to establish the density of the dispersion which results. Automatic variable orifice 142 is preferably used with the single output tube since it increases the velocity in the lubricant/coolant in the tube and thus increases the quality (i.e., particle size and uniformity) of the dispersion emitted from tubes 52, 54 or 56. Additionally, the variable orifice prevents dripping of lubricant/coolant collected at the remote end of tube 52**, which is likely to occur periodically if single output tubes are used which merely terminate with an open end extremity.

From the foregoing, it will thus be seen that whenever a supply of compressed air or other fluid is applied to the apparatus 20 via coupling 42 and inlet port 81, the applied air pressure is communicated to the pulsatory control apparatus 26 (via passage 80), or the shunt 100, and to the chambers 101 of injector passages 110 in the injector modules **24*a*, etc., having passed through passage 89 in manifold 28 and passages 90, 112 and 121 in the injector modules (see FIGS. 5 and 10). So long as it is present, this compressed air applied to the chambers 101 is accompanied by intermittent, pulsating charges of the lubricant or coolant supplied from source 22 when a single tube is utilized, since the pulsing discharges of lubricant from the injectors 23*a*, 23*b*, 23*c* pass directly into chamber 101 of their associated injector module, thus providing lubricant or coolant in the output tubes 52, 54, 56 and at their end nozzles 64, from which a corresponding mist is ejected so long as the respective injectors continue to be cycled by recurrent charges of compressed air conveyed to them through passage 84 of their injector module 24 from pulse generator 26 via passage 78*b* of base/manifold 28. As already indicated, the frequency of these recurrent actuating pulses can be varied and selected by manipulation of screw 26*a* of pulse generator 26. At the same time, the quantity of lubricant metered out by the injectors 23*a*, 23*b*, 23*c*** upon each successive cycle is variable by adjustment of their control stem, which in effect changes the piston stroke within the injector.

It will also be seen that lubricant/coolant may be output from the remote end of the output tubes 52, 54, 56 and 107 in natural (i.e. non-dispersed) state. That is, the thumb screws 44, 46 and 48 may be seated within inlet 121 (FIG. 10) to form a pin-type valve closure with portion **121*b* of inlet 121. When the thumb screws 44, 46 and 48 seat within inlet 121** in this manner, the control fluid supplied to the injectors 23a-23c is isolated from chamber 101. Tubes 52, 54, 56 and 107 may also output lubricant/coolant in natural state by using lubricant/coolant as the control fluid Additionally, for injectors 23a-23c, chamber 101 and the output tubes 52, 54, 56 and 107 may be primed by providing lubricant to chamber 101 via inlet port 81 and passages 89, 90, 112 and 121.

It will thus be seen that apparatus 20 lends itself ideally to use with saws, drills, taps, mills, punches, shears, roll forms, and other machines, either for through-the-tool application or external spray application to the machine, tool and/or workpiece, in which environment the lubricant-dispensing apparatus will if desired operate automatically by on/off control of an actuating signal from the machining or tool. Of course, it will also be understood that the apparatus of the invention may be used in other environments with many other media, i.e., fluids. Additionally, the device may be mounted and used in any desired orientation or position when used with a pumped or other force-loaded supply rather than the gravity-feed reservoir 22 illustrated in FIG. 1, and attachment by means of a mounting magnet 30 as shown in FIG. 1, although optional, adds a further degree of ease, convenience and flexibility in use.

Inasmuch as the above is merely a description of preferred embodiments of the invention, those of ordinary skill in the art may recognize various changes, alterations and variations which may be made. As noted above, the gravity-feed reservoir 22 may have substituted therefor a pumped or other supply, or one which utilizes the source of compressed air, for example by being connected to the supply line which operates an air tool in conjunction with which the apparatus of the invention may be used. By using a pumped supply or source, the apparatus may be oriented in any manner which is desired, without having to be positioned for gravity feed. Of course, it should be clear that while the invention is illustrated herein with three injector modules, practically any other number of such modules may be used. Yet another variation is to provide the injector modules with independent impulse control generators set to operate at different frequencies, whereby the injectors would all operate to eject lubricant/coolant at different rates through their respective outlet tubes. Thus, it is to be understood that the above detailed a description is merely of particular embodiments of the invention, and that various changes, alterations and variations may be made without departing from the underlying concepts and broader aspects of the invention as set forth in the appended claims, which are to be interpreted in accordance with the established principles of patent law and accorded an appropriate scope of equivalents in their application.

The embodiments of the invention in which an exclusive property or privilege is claimed are defined as follows:

1. A method of generating a fluidized mist, comprising the steps of:
   using a positive-displacement device to repetitively move discrete quantities of liquid into a chamber;
   applying compressed gas to said chamber to disperse the liquid in said chamber into a plurality of smaller quantities and move the smaller quantities of liquid into a tube, said compressed gas passing through said chamber to positively displace the smaller quantities of liquid from said chamber into said tube, whereby said liquid is propelled through said tube to a remote end thereof;
   emitting said smaller quantities of liquid from said tube in dispersed form in response to said compressed gas being applied to said chamber; and
   using a fluid-dispensing variable-resistance orifice at the end of said tube remote from said chamber, said orifice dispensing a generally uniform mist of said liquid from said chamber when the pressure in said tube is sufficiently high to exceed a cracking pressure threshold of said orifice.

2. The method as defined in claim 1, further including the step of generating pneumatic command signals for controlling the positive-displacement device to displace said liquid into said chamber.

3. The fluid-dispensing apparatus as defined in claim 2, wherein said step of generating pneumatic command signals includes applying compressed gas to said positive-displacement device and to said chamber, whereby said compressed air propels said metered liquid through said tube.

4. The method as defined in claim 1, including the steps of displacing said liquid from said chamber into said tube in dispersed form, and carrying the dispersed liquid along said tube in dispersed form.

5. The method as defined in claim 1, including the step of actuating said positive-displacement device by applying pulses of compressed gas thereto, and wherein said step of applying compressed gas to said chamber includes using a source of compressed gas distinct from a source used to provide said pulses of compressed gas to said positive-displacement device.

6. A respective, pulsatory, fluid-actuated apparatus for dispensing a succession of metered quantities of liquid in response to a control signal, comprising:
   means for producing repetitive impulses of compressed gas, impulse-responsive liquid-metering means, and means for applying said impulses of gas to said liquid-metering means such that said repetitive impulses control actuation of said liquid-metering means to cause discrete individually metered quantities of liquid to be dispensed by said liquid-metering means on a recurring basis corresponding to the repetitions of said impulses;
   means defining a chamber for receiving said discrete individually metered quantities of liquid repetitively metered and dispensed by said liquid-metering means;
   means for pneumatically displacing the liquid from said chamber into a tube such that said displacing means passes through said chamber means and dispenses said discrete individually metered quantities of liquid in droplets into said tube whereby said liquid is positively displaced from said chamber means;
   means for pneumatically propelling said droplets through said tube to a dispensing point; and
   a fluid-dispensing variable-resistance orifice coupled to the end of said tube remote from said chamber, said orifice being closed to prevent passage of fluid therethrough when the pressure in said tube is below a predetermined cracking pressure threshold, said orifice acting to emit a mist of said liquid dispensed from said chamber when the pressure in said tube is sufficiently high to exceed said predetermined cracking pressure threshold of said orifice.

7. The liquid-dispensing apparatus as defined in claim 6, wherein said means for pneumatically displacing said liquid applies compressed gas to said chamber to displace and disperse aid liquid into said tube.

8. The liquid-dispensing apparatus as defined in claim 6, wherein said tube is directly connected to said chamber, whereby said metered liquid is displaced directly into said tube.

9. The liquid-dispensing apparatus as defined in claim 6, wherein said variable-resistance orifice includes a resiliently-biased reclosable opening for emitting said liquid mist.

10. The liquid-dispensing apparatus as defined in claim 6, wherein said means for pneumatically displacing the liquid from said chamber provides compressed gas to said means for producing repetitive impulses of compressed gas and also provides compressed gas to said chamber, for displacing said liquid therefrom.

11. Means according to claim 7, wherein said variable-resistance orifice comprises a molded member of resilient material having integral edge portions defining a normally-closed opening.

12. The fluid-dispensing apparatus as defined in claim 7 wherein said means for pneumatically displacing said liquid includes means defining a passage for applying said compressed gas to said chamber at an angle substantially orthogonal to an axis of said tube where said tube connects to said means defining a chamber.

13. The apparatus as defined in claim 6 wherein said chamber includes a first inlet connected to an outlet of said liquid-metering means, a second inlet communicating with said displacing means, and an outlet connected to said tube whereby said displacing means propels liquid from said chamber means into said tube.

* * * * *

UNITED STATES PATENT AND TRADEMARK OFFICE
CERTIFICATE OF CORRECTION

PATENT NO. : 5,205,378
DATED : April 27, 1993
INVENTOR(S) : Wallace G. Boelkins

It is certified that error appears in the above-indentified patent and that said Letters Patent is hereby corrected as shown below:

Col. 14, line 33, claim 6
  "respective" should be ---repetitive---

Col. 15, line 4, claim 7
  "aid liquid" should be ---said liquid---

Signed and Sealed this

Third Day of May, 1994

Attest:

BRUCE LEHMAN

*Attesting Officer*     *Commissioner of Patents and Trademarks*